US007734301B2

(12) United States Patent
Izaki (10) Patent No.: US 7,734,301 B2
(45) Date of Patent: Jun. 8, 2010

(54) COMMUNICATION SYSTEM (75) Inventor: Takeshi Izaki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1901 days.

(21) Appl. No.: 10/650,742

(22) Filed: Aug. 29, 2003

(65) Prior Publication Data

US 2004/0043785 A1    Mar. 4, 2004

(30) Foreign Application Priority Data

Aug. 30, 2002    (JP)    ............................. 2002-255440

(51) Int. Cl.
*H04W 4/00*    (2009.01)
*H04M 1/00*    (2006.01)
(52) U.S. Cl. ...................... 455/463; 379/156; 379/164; 379/208.01; 455/462; 455/554.1
(58) Field of Classification Search ............ 379/167.11, 379/167.12, 161, 164, 207.04–207.09, 156–165, 379/377, 93.09, 93.11; 455/426.1, 461, 462, 455/463, 41.2, 401, 554.1–555, 426, 465
See application file for complete search history.

(56) References Cited

U.S. PATENT DOCUMENTS

| 4,430,702 | A | * | 2/1984 | Schiebe et al. .............. 710/305 |
| 4,723,264 | A | * | 2/1988 | Sasuta et al. ................ 455/410 |
| 4,776,001 | A | * | 10/1988 | Murata et al. ............... 455/463 |
| 4,821,310 | A | * | 4/1989 | Lynk et al. .................. 455/517 |
| 5,022,068 | A | * | 6/1991 | Fujisaki et al. .............. 455/463 |
| 5,280,630 | A | * | 1/1994 | Wang ...................... 455/452.2 |
| 5,530,951 | A | * | 6/1996 | Argintar .................... 379/67.1 |
| 5,570,411 | A | * | 10/1996 | Sicher ....................... 455/450 |
| 5,592,534 | A | * | 1/1997 | Ito .......................... 455/435.1 |
| 5,644,621 | A | * | 7/1997 | Yamashita et al. ........... 455/463 |
| 5,966,665 | A | * | 10/1999 | Taki .......................... 455/463 |
| 5,991,386 | A | * | 11/1999 | Nurmi .................... 379/208.01 |
| 6,160,872 | A | * | 12/2000 | Karnowski et al. ....... 379/93.09 |

(Continued)

FOREIGN PATENT DOCUMENTS

JP     A 2-217030     8/1990

(Continued)

OTHER PUBLICATIONS

U.S. National Stage Worksheet for U.S. Appl. No. 10/204,556 (US-2003/013440) Takatori et al. showing 35 USC 371 requirements met on Aug. 22, 2002.*

*Primary Examiner*—George Eng
*Assistant Examiner*—Matthew Sams
(74) *Attorney, Agent, or Firm*—Oliff & Berridge, PLC (57) ABSTRACT

A communication system has a main device capable of communicating with a destination station through a line and at least one subsidiary device connectable to the main device. The main device includes an operating state signal transmitting system that transmits an operating state signal representing that the main device is currently performing a predetermined operation when the main device receives, from the subsidiary device, a communication request signal requesting a communication from the subsidiary device through the line, while the subsidiary device includes a first notifying system that notifies that the main device is performing the predetermined operation when the subsidiary device receives the operating state signal from the main device.

6 Claims, 9 Drawing Sheets

U.S. PATENT DOCUMENTS

| | | | |
|---|---|---|---|
| 6,212,221 B1* | 4/2001 | Wakayama et al. | 375/133 |
| 6,393,275 B1* | 5/2002 | Alfred | 455/422.1 |
| 6,725,457 B1* | 4/2004 | Priem et al. | 718/104 |
| 6,781,979 B1* | 8/2004 | Ebata et al. | 370/338 |
| 6,788,953 B1* | 9/2004 | Cheah et al. | 455/550.1 |
| 6,952,588 B1* | 10/2005 | Igarashi | 455/463 |
| 7,046,961 B2* | 5/2006 | Park | 455/41.2 |
| 2002/0101970 A1* | 8/2002 | Contractor | 379/209.01 |
| 2003/0013440 A1* | 1/2003 | Takatori et al. | 455/422 |

FOREIGN PATENT DOCUMENTS

| | | | |
|---|---|---|---|
| JP | A 5-95389 | 4/1993 | |
| JP | A 2000-151787 | 5/2000 | |

* cited by examiner

COMMUNICATION SYSTEM

BACKGROUND OF THE INVENTION

The present invention relates to a communication system including a main phone (telephone) and a cordless handset wirelessly connected to the main phone.

Conventionally, a so-called cordless telephone connected to a public telephone line (hereinafter, occasionally referred to as an outside line) is provided with a cordless handset. In such a telephone, when a request signal to communicate with a destination telephone through the outside line is transmitted from the cordless handset to the main phone, if the main phone is used for a certain operation such as another outside line call, or transmitting or receiving facsimile data, signals are returned from the main phone to the cordless handset.

In the cordless handset, since no signals are transmitted from the main phone to the cordless handset in response to the request signal, a busy tone, which is usually output when there is a trouble in the wireless connection between the cordless phone and the main phone, is output. Because of the above configuration, the user cannot know, from the busy tone, whether there is a trouble in connection between the main phone and the cordless handset or the main phone is performing another function. If the busy tone was output due to an abnormal connection condition, the user may retry to connect to the main phone. On the other hand, if the main phone is performing another function, it would be better for the user to retry after a certain period has passed. However, in the conventional communication system as described above, the user cannot know the status of the main phone.

SUMMARY OF THE INVENTION

The present invention is advantageous in that the above defects of the conventional communication system is overcome, and an improved communication system with which the user can recognize the state of the main phone is provided.

According to an aspect of the invention, there is provided a communication system having a main device capable of communicating with a destination station through a line and at least one subsidiary device connectable to the main device. The main device includes an operating state signal transmitting system that transmits an operating state signal representing that the main device is currently performing a predetermined operation when the main device receives, from the subsidiary device, a communication request signal requesting a communication from the subsidiary device through the line, while the subsidiary device includes a first notifying system that notifies that the main device is performing the predetermined operation when the subsidiary device receives the operating state signal from the main device.

Optionally, the first notifying system includes a displaying unit that displays a message indicating the main device is in an operating state.

Optionally or alternatively, the first notifying system includes an audio notifying system that notifies the main device is in an operating state with sound. In this case, the audio notifying system notifies the main device is in an operating state with a predetermined sound. Optionally or alternatively, the audio notifying system notifies the main device is in an operating state with a voice message.

Still optionally, the subsidiary device may include an urgency determining system that determines whether the communication request signal requests an urgent communication, and an interruption signal transmitting system that transmits an interruption signal requesting the main device to interrupt the predetermined operation when the urgency determining system determines that the communication request signal requests the urgent communication, regardless whether the subsidiary device receives the operating state signal from the main device.

In a particular case, the main device includes an interrupting system that interrupt the predetermined signal when the main device receives the interruption signal from the subsidiary device. Optionally, the main device includes a second notifying system notifying that the predetermined operation is to be interrupted.

Optionally, the main device includes a second notifying system notifying that the predetermined operation is to be interrupted. In this case, the second notifying system may include a displaying unit that displays a message indicating the predetermined operation is to be interrupted. Optionally or alternatively, the second notifying system includes an audio notifying system that notifies the predetermined operation is to be interrupted with sound.

Still optionally, the subsidiary device includes a connection request signal transmitting system that transmits a connection request signal requesting that the subsidiary device is connected to another device through the line after the interruption signal transmitting system transmits the interruption signal to the main device.

Further optionally, the main device includes a line connecting system that connects the subsidiary device to the line when the main device received the connection request signal from the subsidiary device through the connection request signal transmitting system.

Optionally, the subsidiary device includes an disconnecting signal transmitting system that transmits a disconnecting signal requesting the main device to disconnect the connection with the subsidiary device when the subsidiary device receives the operating state signal from the main device.

In a particular case, the operating state signal may include a busy signal indicating that said main device is operating.

Further optionally, the interruption signal transmitting system transmits the interruption signal to the main device when the urgency determining system determines that the communication request signal requests the urgent communication after the subsidiary device receives the operating state signal from the main device in response to the communication request signal.

In a particular case, the main device may be a main phone, and the subsidiary device may include at least one cordless handset.

Still optionally, the subsidiary device includes an interruption signal transmitting system that transmits an interruption signal requesting the main device to interrupt the predetermined operation when the subsidiary device receives the operating state signal from the main device in response to the communication request signal for an urgent communication.

According to another aspect of the invention, there is provided a communication system having a main device capable of communicating with a destination station through a line and at least one subsidiary device connectable to the main device, wherein the subsidiary device includes a notifying system that notifies that the main device should be examined when the subsidiary device transmits a connection request signal requesting to perform a communication through the line to the main device and no response is received from the main device.

Optionally, the notifying system includes a displaying unit that displays a message indicating the main device should be examined. Optionally or alternatively, the notifying system includes an audio notifying system that notifies the main device should be examined with sound.

According to a further aspect of the invention, there is provided a communication system having a main device capable of communicating with a destination station through a line and at least one subsidiary device connectable to the main device. In this system, the subsidiary device includes a connection request signal transmitting system that transmits a connection requesting signal requesting to perform a communication through the line to the main device, while the main device includes a status signal indicative of an operational status of the main device to the subsidiary device in response to the connection requesting signal transmitted from the subsidiary device. Further, the subsidiary device performs different operations in accordance with the status signal transmitted from the main device.

Further, the subsidiary device may be configured to transmit a line release requesting signal requesting the main device to release the line, if a communication to be performed by the subsidiary device satisfies a predetermined condition when the subsidiary device receives the status signal indicating that the main device is using the line.

In a particular case, the predetermined condition includes urgency of the communication. Optionally or alternatively, the predetermined condition includes at least one predetermined number.

Further optionally, if the predetermined condition is not satisfied, the connection between the main device and the subsidiary device is cut.

Furthermore, the main device includes a notification system that notifies that the line is to be released when the main device receives the line release requesting signal from the subsidiary device.

According to a furthermore aspect of the invention, there is provided a communication system having a main device capable of communicating with a destination station through a line and at least one subsidiary device connectable to the main device. In such a system, the main device may include a voice message transmitting system that transmits a voice message indicating that the main device is currently performing a predetermined operation when the main device receives, from the subsidiary device, a communication request signal requesting a communication from the subsidiary device through the line, and the subsidiary device includes an audio output system that outputs the voice message transmitted form the main device as an audible message.

DESCRIPTION OF THE EMBODIMENT

Hereinafter, a communication system according to an embodiment of the invention will be described with reference to the accompanying drawings.

Figure 1:
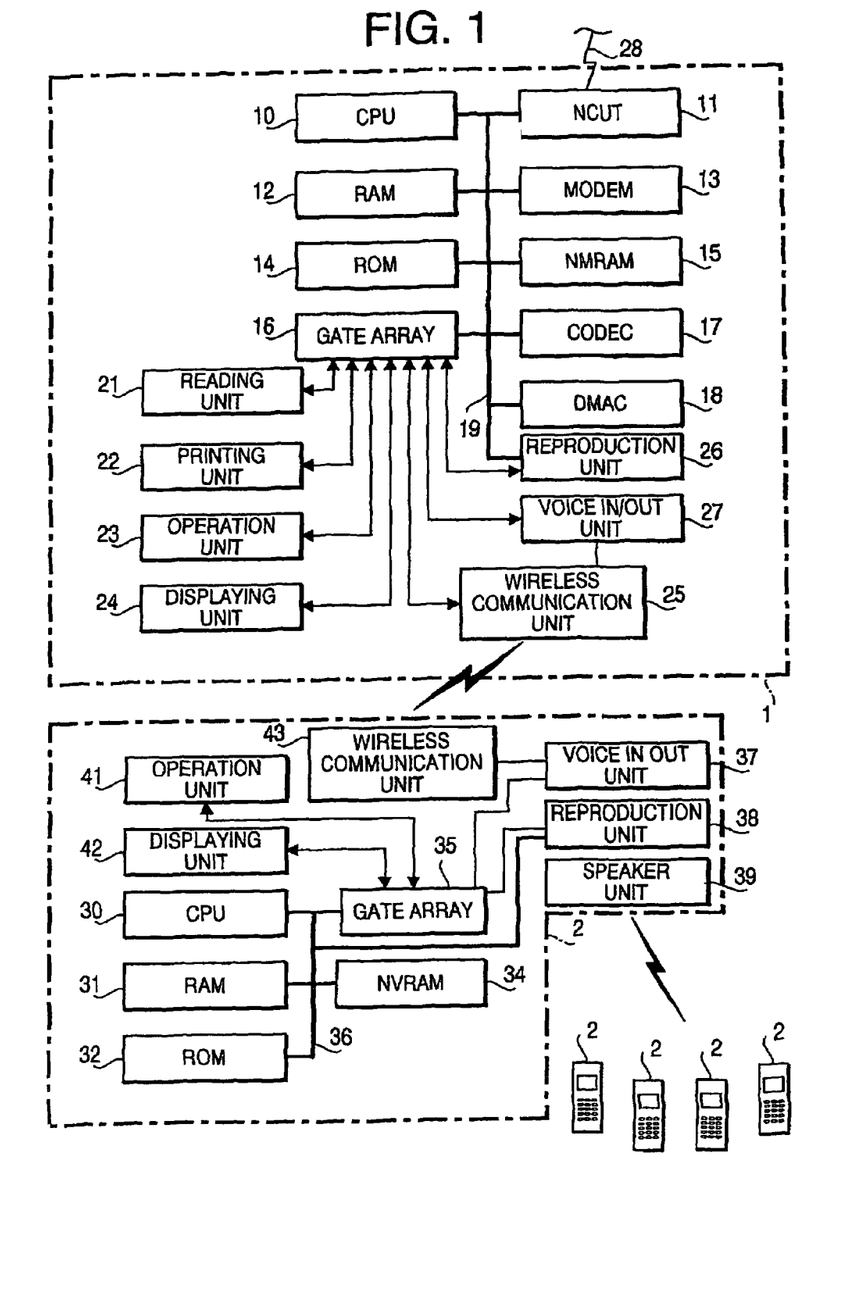
FIG. 1 schematically shows a block diagram of a communication system including a main phone and a plurality of cordless handsets (i.e., sub phones)

FIG. 1 schematically shows a block diagram of a communication system including a main phone (i.e., a main device) 1 and a plurality of cordless handsets (i.e., subsidiary devices) 2, each of which is capable of communicating with the main phone 1 wirelessly.

In this embodiment, the main phone is constituted as a MFP (Multi-Function Peripheral) having functions of inkjet printer, image communicating device. When the facsimile machine function is used, an original carrying an image thereon is scanned with the scanner function, and the scanned image is transmitted using the image communicating device function. When facsimile data is received with the image communicating device function, the received data is printed out with the printer function on a predetermined sheet of paper. Further to the above-described functions, the MFP may be connected to a personal computer and functions as peripherals (i.e., printer and scanner) of the personal computer. With use of the scanner function and printer function, the MFP can also be used as a copier.

The main phone 1 includes, as shown in FIG. 1, a CPU (Central Processing Unit) 10, an NCU (Network Control Unit) 11, a RAM (Random Access Memory) 12, a MODEM 13, a ROM (Read Only Memory) 14, an NVRAM (Non-Volatile RAM) 15, a gate array 16, a CODEC 17 and a DMAC 18 which are interconnected through a bus 19. The bus 19 includes an address bus, data bus and control signal lines.

Further, in the main phone 1, to the gate array 16, a reading unit 21, a printing unit 22, an operation unit 23, a displaying unit 24, a wireless communication unit 25, a reproduction unit 26 and a voice in/out unit 27 are connected. The NCU 11 is connected to the public telephone line network 28 (hereinafter, occasionally referred to as an outside line). The voice in/out unit 27 is configured as a handset of the main phone, and includes a microphone and speaker for inputting and outputting voices, respectively.

The CPU 10 controls the entire operation of the main phone 1. The NCU 11 controls the connection with the network. The RAM 12 is a volatile memory and mainly provides working area for the CPU 10. The MODEM 13 is used for modulating/demodulating audio data and/or facsimile data. The ROM 14 mainly stores programs to be executed by the CPU 10. The NVRAM 15 stores data and various parameters.

The gate array 16 functions as an interface between the CPU 10 and units 21 through 27. The CODEC 17 is used for encoding/decoding the audio signals and/or facsimile data. The. DMAC 18 is mainly used for writing/retrieving data to/from the RAM 12.

The reading unit 21 includes an image sensor, an LED and a sheet feeding motor (not shown), and scans an image formed on an original sheet under control of the CPU 10 to capture image data.

The printing unit 22 forms an image on a sheet in accordance with image data. In this exemplary embodiment, the printing unit 22 is configured as a thermal printer, and capable of forming a monochromatic or color image.

Figure 2:
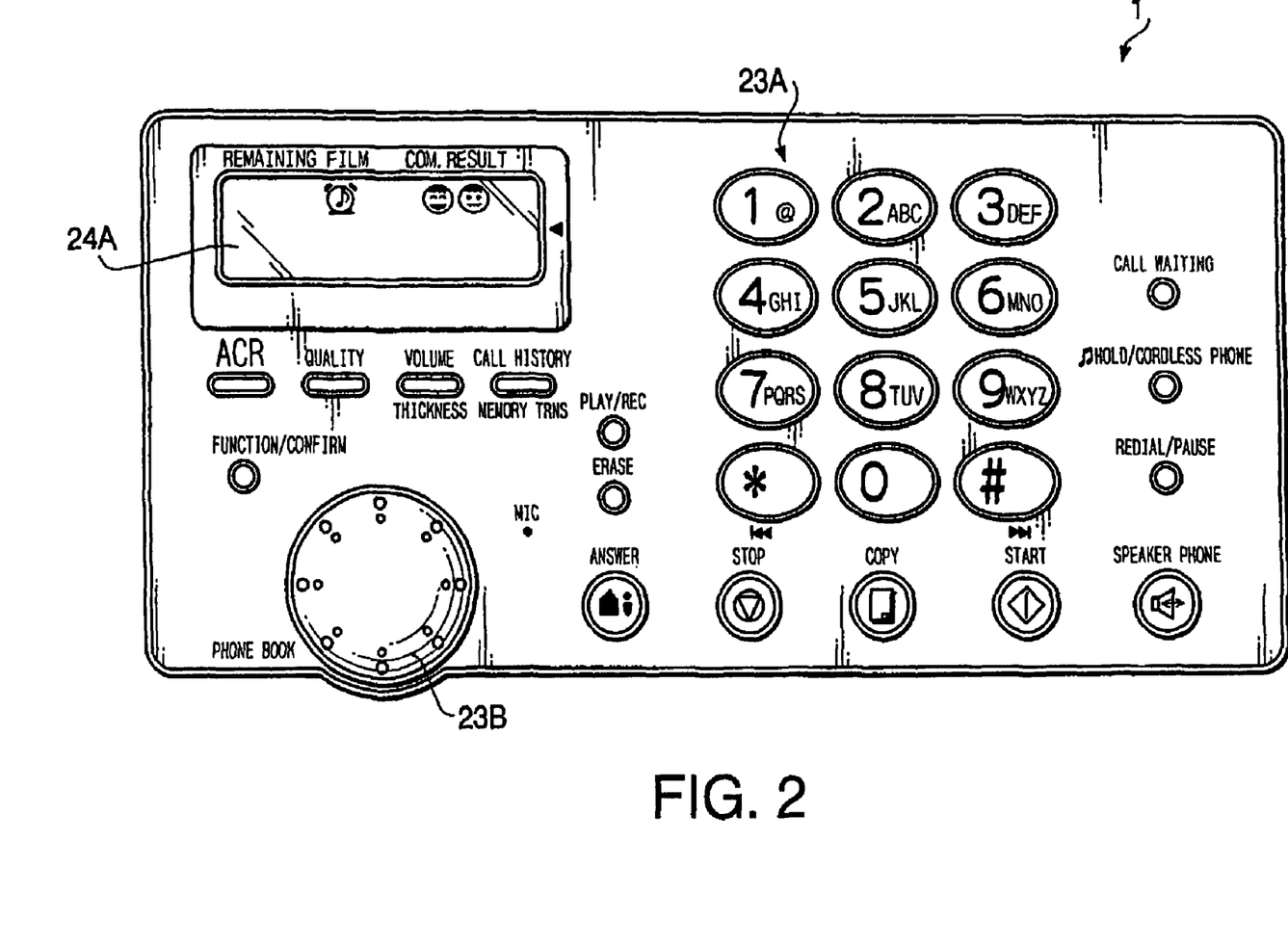
FIG. 2 shows a front panel of the main phone.

The operation unit 23 is, as shown in FIG. 2, a dial key 23A, a jog dial key 23B, and other operation keys. As a user operates the keys thereon, input signals corresponding to the key operations are transmitted to the CPU 10.

The displaying unit 24 includes, as shown in FIG. 2, an LCD (Liquid Crystal Display) panel 24A, on which operation status, operation guidance and other information is displayed.

The wireless communication unit 25 is provided with an antenna (not shown), and wirelessly exchanges audio signal and various data with each of the cordless handsets 2.

The reproduction unit 26 reproduces voice message based on message data stored in the NVRAM 15, which is transmitted to a destination of a telephone call through the NCU 11, or to the cordless handset through the wireless communication unit 25.

The voice in/out unit 27 is the handset of the main phone 1, and used for voice communication with the destination of a telephone call or with each of the cordless handset 2.

The cordless handsets 2 are generally located in places remote from the main phone 1 (in rooms different from a room where the main phone 1 is placed).

Each of the cordless handset 2 includes, as shown in FIG. 1, a CPU 30, a RAM 31, a ROM 32, an NVRAM 34, a gate array 35, which are interconnected through a bus 36. To the gate array 35, an operation unit 41, a displaying unit 42, a wireless communication unit 43, a reproduction unit 46, a voice in/out unit 47 and a speaker unit 48 are connected. It should be noted that, as the cordless handset 2, cell phones or PHS devices may be used optionally or alternatively, if they can be wirelessly connected to the main phone 1.

The CPU 30 controls the entire operation of the cordless handset 2. The RAM 31 is a volatile memory and mainly provides working area for the CPU 30. The ROM 32 mainly stores programs to be executed by the CPU 30. The NVRAM 34 stores data and various parameters.

The gate array 35 functions as an interface between the CPU 30 and units 41 through 43, and units 46 through 48.

Figure 3:
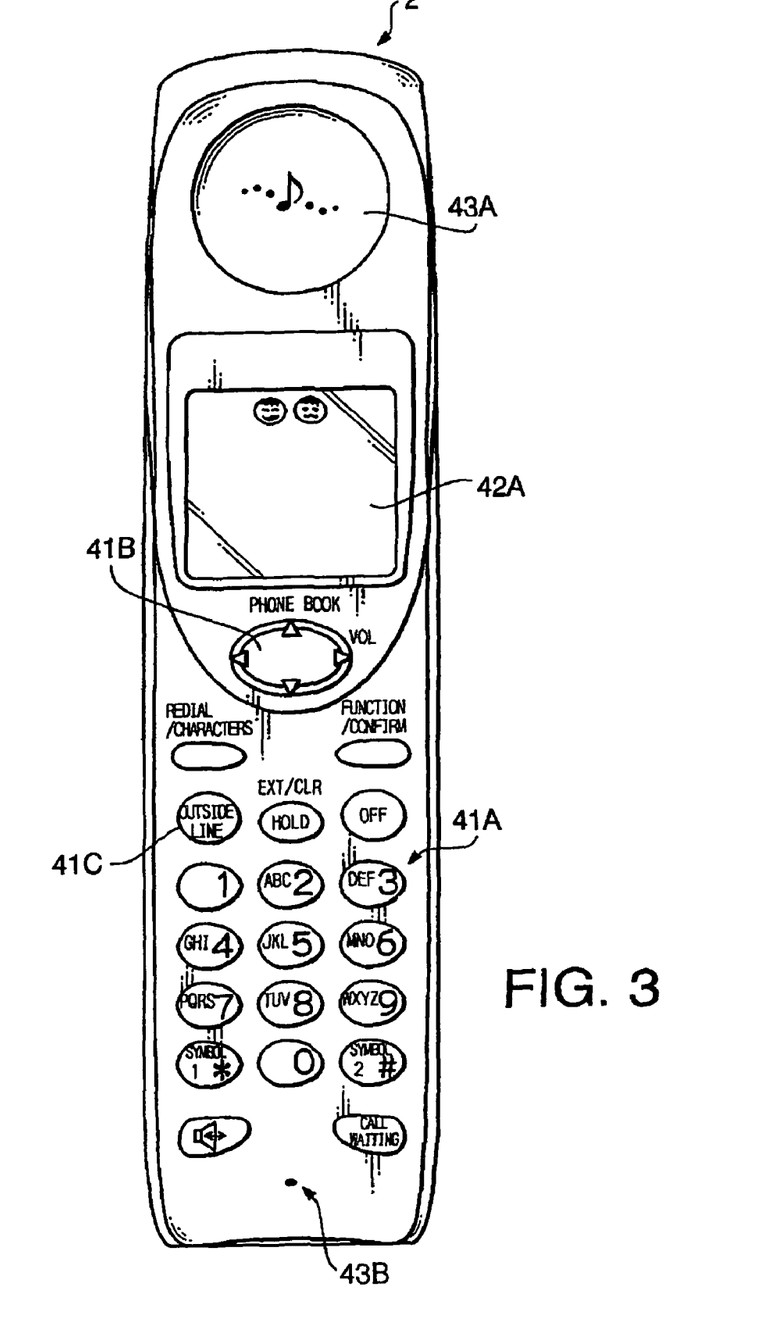
FIG. 3 shows a front view of the cordless handset.

The operation unit 41 is, as shown in FIG. 3, a dial key 41A, a select key 41B, an outside line key 41C, and other operation keys. As a user operates the keys thereon, input signals corresponding to the key operations are transmitted to the CPU 30.

The displaying unit 42 includes, as shown in FIG. 3, an LCD panel 42A, on which operation status, operation guidance and other information is displayed.

The wireless communication unit 43 is provided with an antenna (not shown), and wirelessly exchanges audio signal and various data, through a communication channel and a control channel, with the main phone 1 or another cordless handset 2.

The reproduction unit 46 reproduces voice message based on message data stored in the NVRAM 34, which is transmitted to the main phone 1 or the cordless handset through the wireless communication unit 43.

The voice in/out unit 47 includes a speaker 43A and a microphone 43B, and used for voice communication with the destination of a telephone call through the main phone 1, or with another cordless handset 2.

The speaker unit 48 is provided to output, for example, a voice message reproduced by the reproduction unit 46. Although not shown in FIG. 1, another microphone may be provided and functions, in association with the speaker unit 48, to enable a so-called hands-free voice communication, without using the void in/out unit 47.

Next, an operation of the communication system according to the embodiment of the invention will be described with reference to sequences shown in FIGS. 4, 6 and 8.

Figure 4:
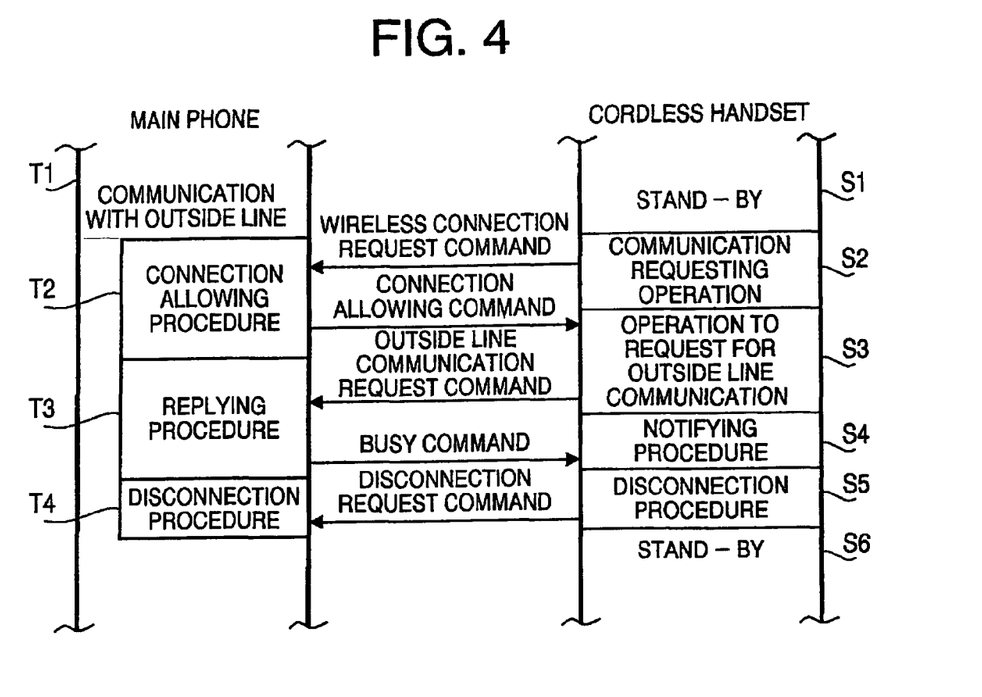
FIG. 4 is a chart showing a sequence of exchanging commands between the main phone and the cordless handset.

FIG. 4 shows a sequence of exchanging commands between the main phone 1 and the cordless handset 2. In this example, a request to make a call through the outside line 28 is transmitted from the cordless handset 2 to the main phone 1, while the main phone is performing a certain operation, and is unable to connect to the outside line 28.

In S1, the cordless handset 2 is in a stand-by state. When the user operates the cordless handset 2 (e.g., by operating the outside line key 41C) to issue the request to make the outside line connection (S2), a wireless connection request command is transmitted from the cordless handset 2 to the main phone 1.

As described, at this stage, the main phone 1 is performing a predetermined operation (e.g., a communication with another station through the outside line 28) (T1). Upon receipt of the wireless connection request command from the cordless handset 2, the main phone 1 executes a connection allowing procedure (T2) and transmits a connection allowing command to the cordless handset 2 automatically. It should be noted that this response is executed as far as the connection between the main phone 1 and the cordless handset 2 which transmitted the wireless connection request command can be established.

Upon receipt of the connection allowing command from the main phone 1, the cordless handset 2 executes an operation to request for the outside line communication (S3) in which an outside line communication request command is transmitted to the main phone 1.

When the outside line communication request command is received, the main phone 1 executes a replying procedure (T3) in which the CPU 10 checks an operational status of the main phone 1. In this example, since the main phone 1 is performing the outside line communication through the outside line 28, a busy command, which represents the main phone 1 is performing a predetermined procedure, is transmitted from the main phone 1 to the cordless handset 2.

According to the embodiment, the busy command is issued when the main phone 1 is communicating through the outside line 28, receiving or transmitting facsimile data, or communicating with another cordless handset 2.

Figure 5:
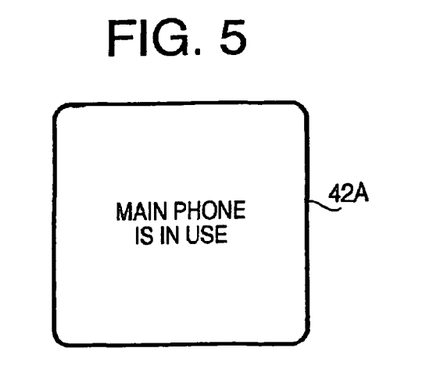
FIG. 5 is an example of a message indicated on a display unit of the cordless handset.

When the busy command is received, the cordless handset 2 executes a notifying procedure (S4) and notifies a user that the main phone 1 is being occupied. According to an embodiment, the notification is made by displaying a message (e.g., "MAIN PHONE IS IN USE") on the LCD panel 42A of the displaying unit 42 as shown in FIG. 5.

Optionally or alternatively, in the replying procedure, the CPU 10 of the main phone 1 retrieves audio data of a voice message of the similar content (e.g., "MAIN PHONE IS IN USE") from the NVRAM 15, reproduces the voice message with the reproduction unit 26, and transmits the reproduced voice message to the cordless phone through the wireless communication unit 25. The voice message is received by the cordless handset 2 through the wireless communication unit 43, and output by the voice in/out unit 47. Alternatively, the audio data of the voice message may be transmitted from the main phone 1 to the cordless handset 2, and the voice message is reproduced by the reproduction unit 46 of the cordless handset 2, and output by the speaker unit 48. Still alternatively, upon receipt of the busy command, the CPU 30 of the cordless handset 2 retrieves audio data of a voice message of the similar content (e.g., "MAIN PHONE IS IN USE") from the NVRAM 34, reproduces the voice message with the reproduction unit 46, and outputs the voice message from the speaker unit 48. It should be noted that, instead of the voice message, a predetermined sound may be used for notifying purpose.

After the notification, the cordless handset 2 executes a disconnecting procedure (S5) and transmits a disconnection request command to the main phone 1 to disconnect the wireless communication therebetween.

In response to the disconnection request command, the main phone 1 executes a disconnection procedure (T4), and cut the wireless connection between the main phone 1 and the cordless handset 2. Then, the cordless handset 2 is brought into the stand-by status (S6), while the outside line communication is continued in the main phone 1.

As described above, when the main phone 1 is performing a predetermined operation, it is notified by sound and/or text, the user of the cordless handset 2 recognizes the status (i.e., the main phone 1 is performing a predetermined operation) immediately. As aforementioned, in the conventional system, only a busy tone rings in the above situation, and thus the user cannot determine whether the connection was abnormal or the main phone 1 is performing the predetermined operation. According to the above embodiment, the user recognizes the status of the main phone 1 and thus can determine how to react against the situation.

Further, since the disconnection request command is transmitted from the cordless handset 2, and the connection between the main phone 1 and the cordless handset 2 is cut, the user of the cordless handset 2 can use the cordless handset 2 in another way. For example, if the cordless handset 2 is implemented with a mailer function or a gaming function, the user immediately use such a function.

Figure 6:
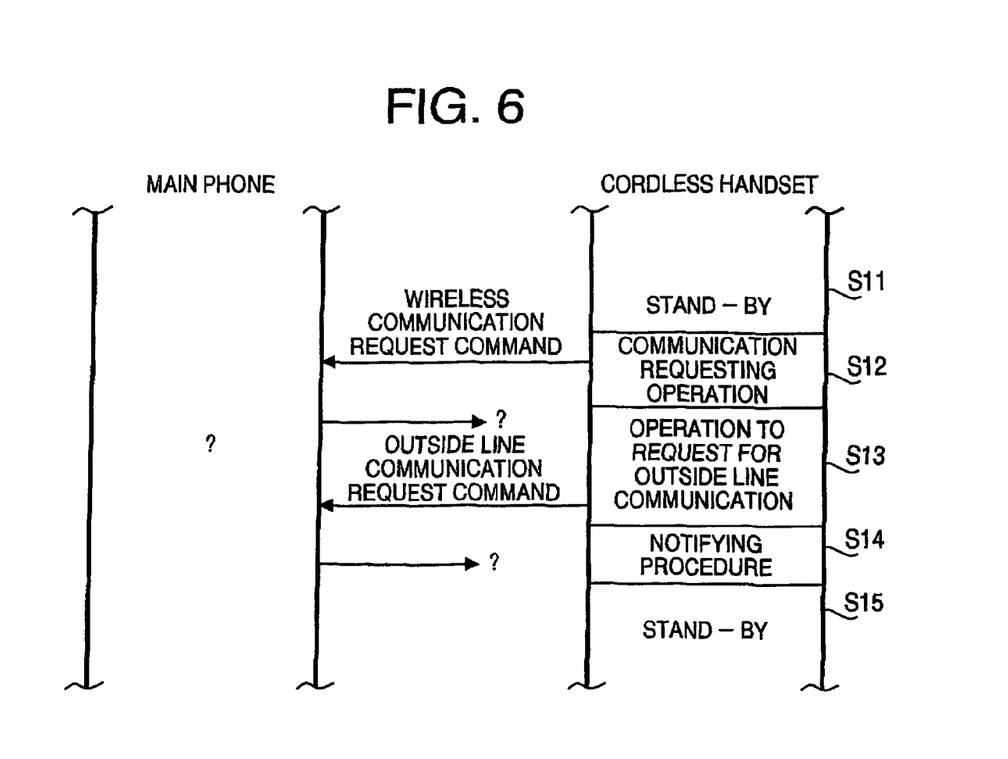
FIG. 6 is a chart showing a sequence of exchanging commands between the main phone and the cordless handset.

FIG. 6 is a chart showing a sequence when the cordless handset 2 attempts to connect with the main phone 1 but the communication is not established.

In S11, the cordless handset 2 is in the stand-by state. When the user operates the cordless handset 2 to request a communication with the main phone 1 (S12), the wireless communication request command is transmitted to the main phone 1. Further, in S13, the cordless handset 2 transmits the outside line communication request command to the main phone 1. It should be noted that, in a certain case, although the flowchart indicates two steps (i.e., S12 and S13), the outside line communication request (which is an application level command) is added to the wireless communication request command (which is a wireless driver level command) and are transmitted at the same time.

In this example, for some reason (e.g., the main phone 1 is powered off, some trouble occurs in the main phone 1 or the wireless communication is disabled due to noises or too weak radiation), the main phone 1 does not return a command to the cordless handset 2.

If the cordless handset 2 does not receive a response from the main phone 1 predetermined period after it transmits the wireless communication request command to the main phone 1, the CPU 30 determines that there occurs a trouble in the main phone 1 or between the main phone 1 and the cordless handset 2, and executes the notifying procedure (S14) to notify the user that there may occur some trouble, and the main phone 1 should be checked.

Figure 7:
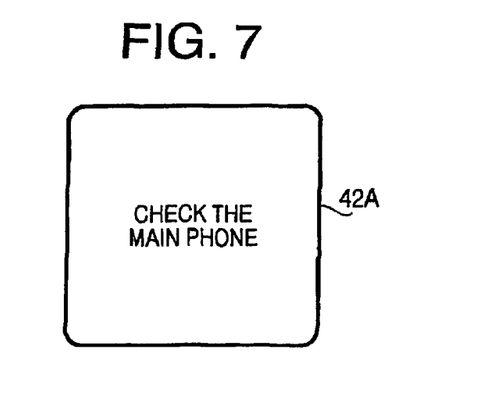
FIG. 7 is another example of a message indicated on a display unit of the cordless handset.

According to an embodiment, the notification is made by displaying a message (e.g., "CHECK THE MAIN PHONE") on the LCD panel 42A of the displaying unit 42 as shown in FIG. 7.

Optionally or alternatively, upon absence of the reply from the main phone 1, the CPU 30 of the cordless handset 2 retrieves audio data of a voice message of the similar content (e.g., "CHECK THE MAIN PHONE") from the NVRAM 34, reproduces the voice message with the reproduction unit 46, and outputs the voice message from the speaker unit 48.

Thereafter, the cordless handset 2 is brought into the stand-by state.

As above, when the main phone 1 does not respond to the command transmitted from the cordless handset to the main phone 1, the user is notified that the main phone 1 should be checked. Therefore, the user can recognize a possibility of some trouble immediately, and deal with the problem promptly.

Figure 8:
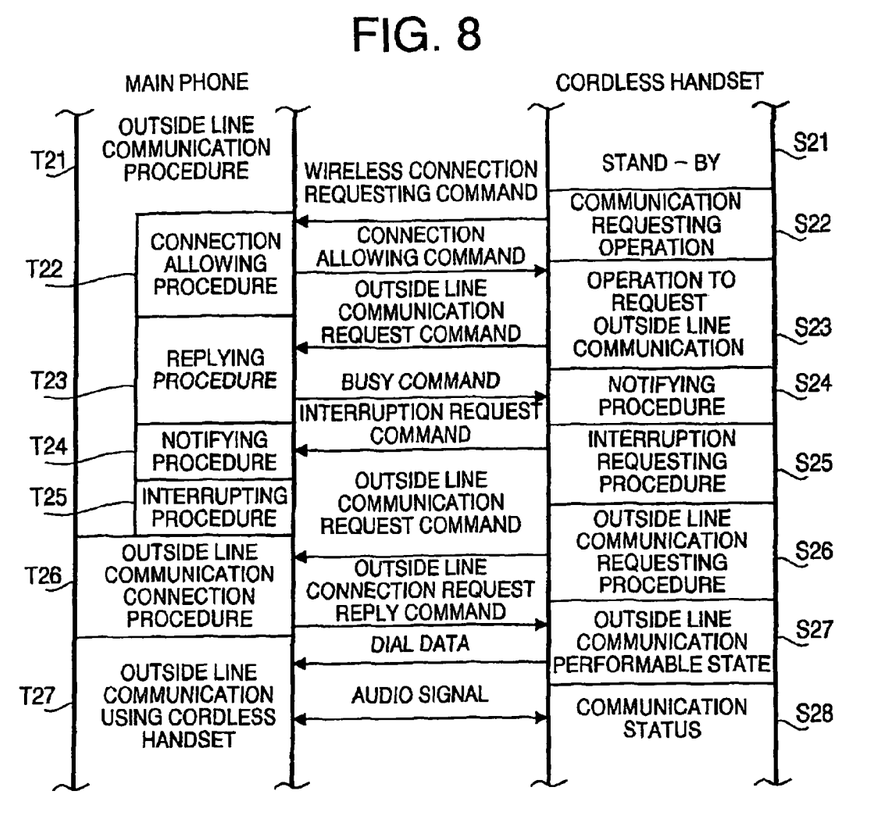
FIG. 8 is a chart showing a sequence of exchanging commands between the main phone and the cordless handset.

FIG. 8 is a chart showing a sequence of exchanging commands between the main phone and the cordless handset when the outside line communication to be made with the cordless handset 2 has urgency.

In S21, the cordless handset 2 is in the stand-by state. When the user operates the cordless handset 2 to request the outside line communication (S22), the wireless connection request is transmitted from the cordless handset 2 to the main phone 1.

As described, at this stage, the main phone 1 is performing a predetermined operation (e.g., a communication with another station through the outside line 28) (T21). Upon receipt of the wireless connection request command from the cordless handset 2, the main phone 1 executes a connection allowing procedure (T22) and transmits a connection allowing command to the cordless handset 2 automatically.

Upon receipt of the connection allowing command from the main phone 1, the cordless handset 2 executes an operation to request for the outside line communication (S23) in which an outside line communication request command is transmitted to the main phone 1.

When the outside line communication request command is received, the main phone 1 executes a replying procedure (T23) in which the CPU 10 checks an operational status of the main phone 1. Since the main phone 1 is performing the outside line communication through the outside line 28, a busy command, which represents the main phone 1 is performing a predetermined procedure, is transmitted from the main phone 1 to the cordless handset 2.

When the busy command is received, the cordless handset 2 executes a notifying procedure (S24) and notifies a user that the main phone 1 is being occupied, similarly to the example shown in FIG. 4. The notification is made similarly to the example shown in FIG. 4.

In this example, it is assumed that the outside line communication request has urgency (e.g., a call to a fire station or police station). Therefore, in S25, an interruption requesting procedure is executed so that the communication currently performed by the main phone 1 is interrupted. When the interruption requesting procedure is executed, an interruption requesting command, which is for forcibly interrupting the predetermined operation currently executed by the main phone 1, is transmitted from the cordless handset 2 to the main phone 1.

Upon receipt of the interruption requesting command, the main phone 1 executes a notifying procedure (T24) for notifying the user of the main phone 1 that the currently performed operation by the main phone 1 will be interrupted.

Figure 9:
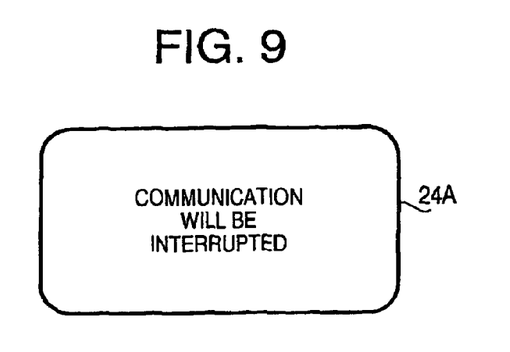
FIG. 9 is an example of a message indicated on a display unit of the main phone.

According to an embodiment, the notification is made by displaying a message (e.g., "COMMUNICATION WILL BE INTERRUPTED") on the LCD panel 24A of the displaying unit 24 of the main phone 1 as shown in FIG. 9.

Optionally or alternatively, in the replying procedure, the CPU 10 of the main phone 1 retrieves audio data of a voice message of the similar content (e.g., "COMMUNICATION WILL BE INTERRUPTED") from the NVRAM 15, reproduces the voice message with the reproduction unit 26, and outputs the reproduced voice message to voice in/out unit 27 which is currently used by the user for communicating through the outside line 28.

According to the above configuration, the user of the main phone 1 is informed of the interruption of the predetermined operation (e.g., the communication through the outside line 28) in advance. Thus, the user will not feel uncertainty with an abrupt interruption of the currently performed operation (e.g., disconnection of the currently performed communication).

After the notification is made in T24, the main phone 1 executes an interrupting operation in which the currently performed predetermined operation is interrupted. Since the interruption is performed automatically, in response to the reception of the interruption request command, a condition for accepting the urgent communication is ready promptly.

In the cordless handset 2, an outside line communication requesting procedure is executed (S26) in which an outside line connection request command is transmitted to the main phone 1.

Upon receipt of the outside line connection requesting command, the main phone 1 executes an outside line connection procedure (T26) in which an outside line connection request reply command indicating that the outside line connection is available is transmitted from the main phone 1 to the cordless handset 2.

When the outside line connection reply command is received, the cordless handset 2 recognizes that the outside line connection is now available (S27) and transmits dial data (e.g., "999"). Then, the main phone 1 connects the cordless handset 2 with the station designated by the dial data through the outside line 28. Then, the connection is established between the cordless handset 2 and the outside line 28, and the audio signals are exchanged therebetween to perform the voice communication (T27, S28).

In this example, when the urgent communication is to be made by the cordless handset 2, the predetermined operation performed in the main phone 1 is interrupted (e.g., the connection was cut). This can be modified such that, when the urgent communication by the cordless handset 2 is finished, the predetermined operation is resumed.

As described above, when the urgent communication is requested by the cordless handset 2, the predetermined operation currently executed in the main phone 1 is automatically interrupted and the urgent communication is prioritized. Therefore, when the user of the cordless handset 2 needs to communicate, for example, with a police station, through the outside line 28, the user can use the line 28 immediately, and is not necessary to look for another way to make such a communication.

Next, operation in each of the main phone and the cordless handset 2 will be described with reference to flowcharts shown in FIGS. 10 and 11.

Figure 10:
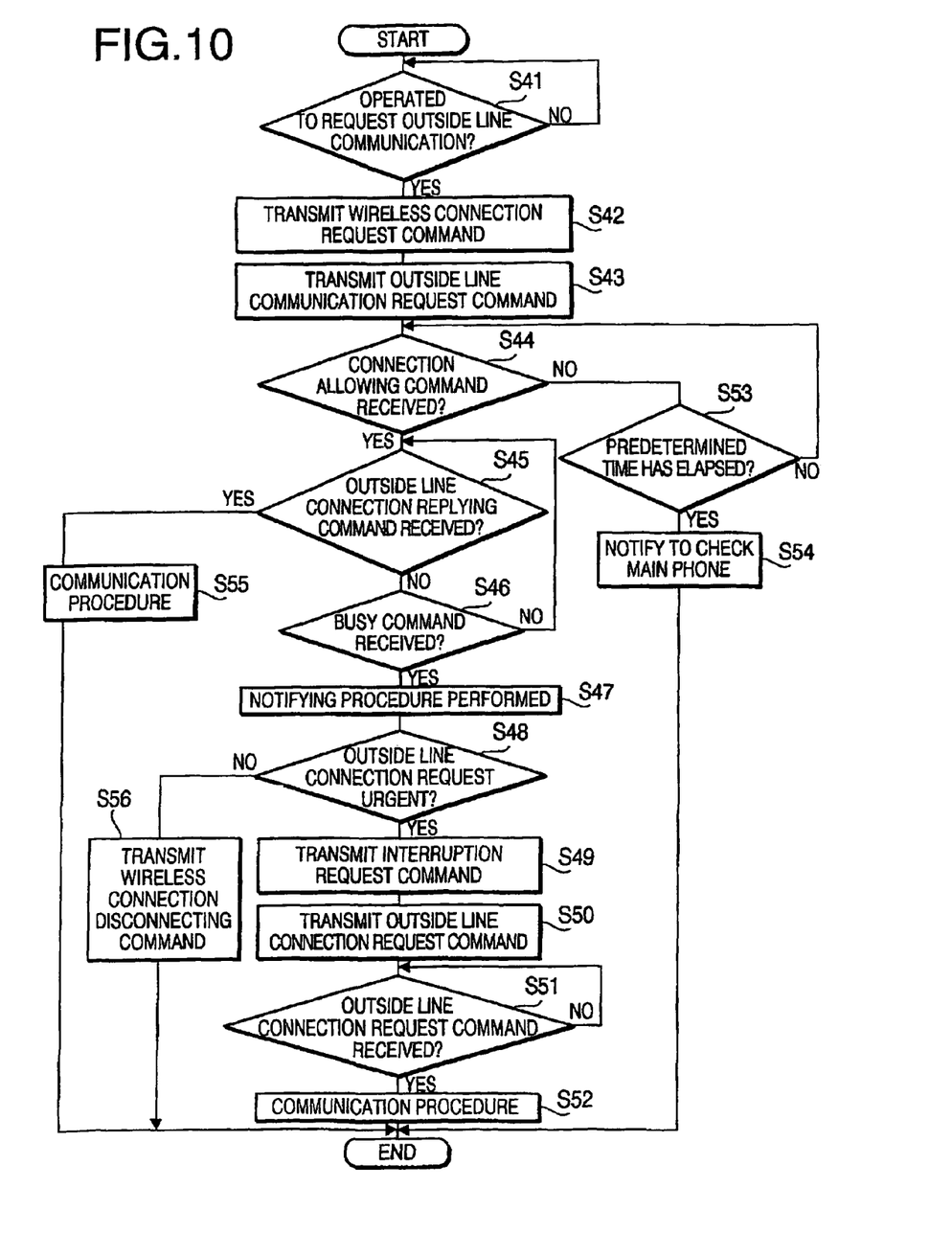
FIG. 10 shows a flowchart illustrating a control of the cordless handset.
Figure 11:
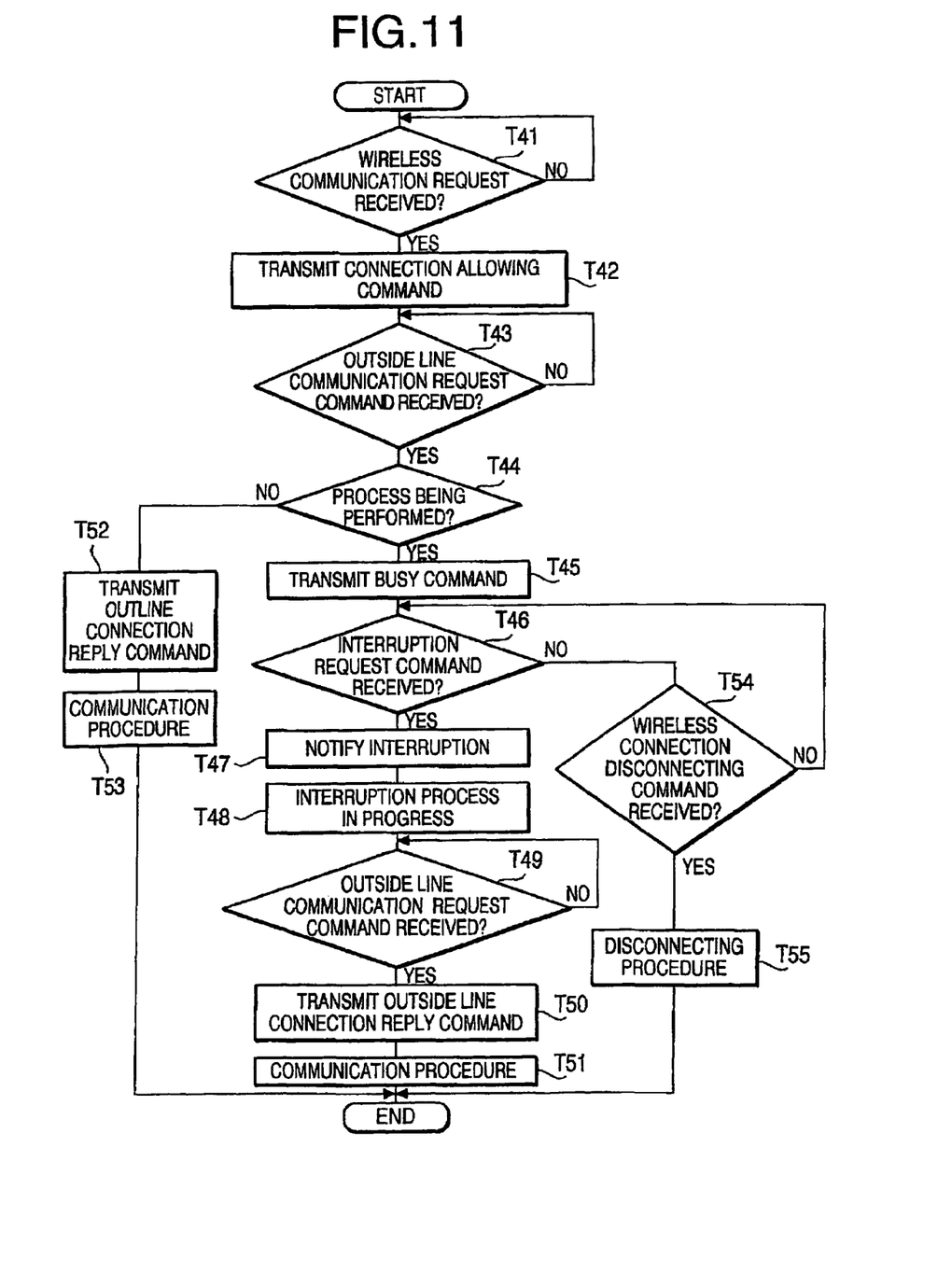
FIG. 11 shows a flowchart illustrating a control of the main phone.

FIG. 10 shows a flowchart illustrating a control of the cordless handset 2, which is executed by the CPU 30. It should be noted that the procedure shown in FIG. 10 is defined by a program to be executed by the CPU 30 and is stored in the ROM 32.

In S41, the CPU 30 determines whether the user has operated the cordless handset 2 to request the outside line communication. This request is made, for example, when the user operates the outside line key 41C of the cordless handset 2.

When the user operated the cordless handset 2 to request the outside line communication (S41: YES), the CPU 30 transmits the wireless connection request command (S42), and the outside line communication request command (S43).

Then, the CPU 30 determines, in S44, whether the connection allowing command is transmitted from the main phone 1 within a predetermined period after the wireless connection request command was transmitted.

When the connection allowing command is received within the predetermined period (S44: YES), the CPU 30 recognizes the wireless connection between the cordless handset 2 and the main phone 1 is established.

Next, the CPU 30 determines whether the outside line connection replying command is received from the main phone 1 (S45). When the outside line connection replaying command is not received (S45: NO), the CPU 40 determines whether the busy command is transmitted from the main phone 1 (S46). Until the outline connection replying command is received or the busy command is received, control repeats steps S45 and S46 (S45: NO; S46: NO).

When the busy command is received (S46: YES), the CPU 30 executes the notifying procedure (S47) to notify the user that the main phone is occupied. As described above, according to one example, the CPU 30 displays a message (e.g., "MAIN PHONE IS IN USE") on the LCD panel 42A (see FIG. 5). This message is displayed for a predetermined period (e.g., 2.5 seconds).

Even though the main phone 1 is performing the predetermined operation and unable to connect the cordless handset 2 with the outside line 28, there are cases where the user of the cordless handset 2 intends to make the outside line communication having urgency. In consideration of such cases, the CPU 30 determines whether the outline connection request is urgent (S48). The urgency is checked, for example, based on the dial data input by the user of the cordless handset 2. Optionally or alternatively, a particular key may be provided for the user to input the intended communication has urgency.

When the outside line communication is urgent (S48: YES), the CPU 30 transmits the interruption request command to the main phone 1 (S49), and further the outside line connection request command (S50).

Then, in S51, the CPU 30 waits for reception of the outside line connection request replying command from the main phone 1. When the CPU 30 receives the outside line connection request replying command (S51: YES), the CPU 30 executes the communication procedure (S52). That is, when the CPU 30 receives the outside line connection request replying command from the main phone 1, it recognizes that the outside line connection is available, and transmits the dial data, which is, for example, input by the user with the dial keys 41A. Then, the outside line communication by the cordless handset 28 through the outside line 28 is performed.

When the connection allowing command is not received within the predetermined period (S44: NO; S53: NO), the CPU 30 recognizes that an abnormal condition (e.g., the main phone 1 is powered off, the main phone 1 is broken, or a communication trouble occurs between the cordless handset 2 and the main phone 1). In such a case, the CPU 30 notifies the user to check the main phone 1. For example, a message is displayed on the LCD panel 42A as aforementioned (S54) (see FIG. 7).

When the CPU 30 receives the outside line connection replying command (S45: YES), the CPU 30 executes the communication procedure (S55). In this case, when the wireless connection request command is transmitted from the cordless handset 2 to the main phone 1, the predetermined operation is not being executed in the main phone 1, and thus the communication through the outside line 28 can be done from the cordless handset 2, immediately.

When the outside line communication to be made in not urgent (S48: NO), the CPU 30 transmits the wireless connection disconnecting command to the main phone 1 (SS6), thereby the wireless connection between the main phone 1 and the cordless handset 2 is released (cut).

Next, an operation of the main phone 1 will be described. FIG. 11 shows a flowchart illustrating a control of the main phone 1, which is executed by the CPU 10 of the main phone 1.

In T41, the CPU 10 determines whether the wireless connection request command is transmitted from the cordless handset 2. When the wireless connection request command is received (T41: YES), the CPU 10 transmits the connection allowance command to the cordless handset 2 which transmitted the wireless connection request command (T42).

In T43, the CPU 10 determines whether the outside line communication request command is transmitted from the cordless handset 2. When the outside line communication request command is received (T43: YES), the CPU 10 checks whether a procedure is currently being performed by the main phone 1 (T44) For example, when a facsimile transmission is being received, the CPU 10 determines that a process is being performed (T44: YES), and transmits the busy command to the cordless handset 2 (T45).

In T46, the CPU 10 determined whether the interruption request command is received from the cordless handset 2. When the interruption request command is received (T46: YES), the CPU 10 notifies the user that the currently performed outside line communication will be interrupted (T47) As aforementioned, according to one embodiment, the notification is made by displaying a message on the LCD panel 24A. With this notification, the user recognizes that the currently performed communication will soon be interrupted. The message is displayed for a predetermined period (e.g., 2.5 seconds), and then control proceeds to T48.

In T48, the CPU 10 forcibly interrupts the currently performed communication. Then, in T49, the CPU 10 determines whether the outside line communication request command is received from the cordless handset 2. When the outside line communication request command is received (T49: YES), the CPU 10 transmits the outside line connection replying command to the cordless handset 2 (T50).

When the CPU 10 determines that no process is currently executed (T44: NO), the CPU 10 transmits the outside line connection reply command (T52), and executes the communication procedure (T53) which allows the communication of the cordless handset 2 though the outside line 28.

When the interruption request command is not received (T46), the CPU 10 determines whether the wireless connection disconnecting command is transmitted from the cordless handset 2 (T54). When the wireless connection disconnecting command is received (T54: YES), the CPU 10 executes the disconnecting procedure (T55), thereby the main phone 1 is brought into the stand-by state. Otherwise, control returns to T46.

The invention needs not be limited to the above-described exemplary embodiment. For example, the control when the outline connection request is urgent may be modified as follows.

Figure 12:
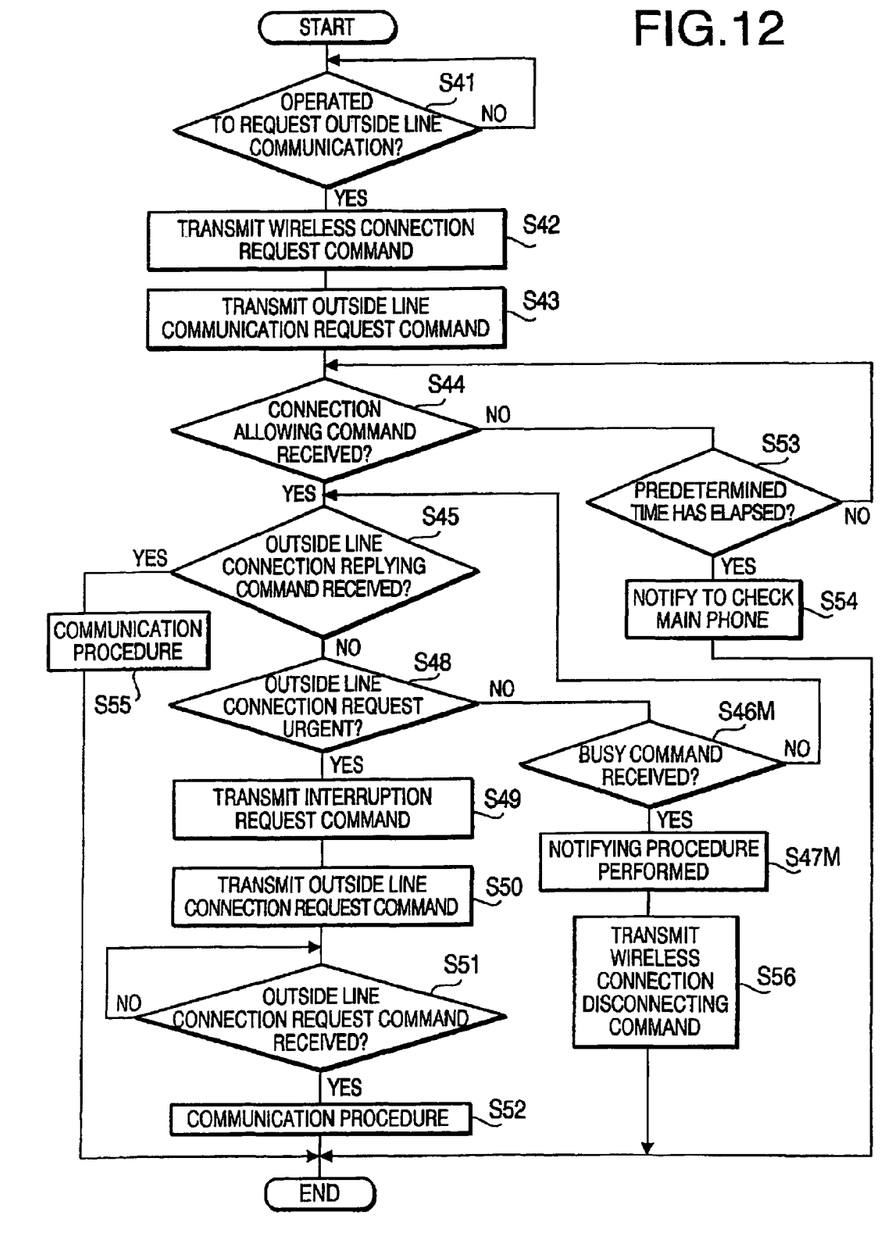
FIG. 12 shows a flowchart illustrating a modification of a procedure shown in FIG. 10.

FIG. 12 shows a modification of the procedure shown in FIG. 10, which is executed by the CPU 30.

The procedure shown in FIG. 12 is similar to that shown in FIG. 10 except that the order of steps S46-S48 is different. According to the control illustrated in FIG. 10, the CPU 30 transmits the outside line communication command to the main phone 1 (S43). Thereafter, when the CPU 30 of the cordless handset 2 receives the busy command from the main phone 1 (S45), the CPU 30 notifies the user that the main phone 1 is occupied (S47). Then, in S48, it is determined whether the outside line connection request is urgent (S48).

According to the modification, when the outside line connection replying command is not received (S45: NO), the CPU 30 determines whether the outside line connection request is urgent (S48). If the outside line connection request is urgent (S48: YES), the interruption request command is transmitted to the main phone 1. Thus, when the outside line connection request is urgent, the CPU 30 immediately transmits the interruption request command to the main phone 1 without confirming whether busy command is transmitted from the main phone, and notifying the same to the user of the cordless handset 2.

When the outside line connection request is not urgent (S48: NO), the CPU 30 determines whether the busy command is received (S46M). When the busy command is not received (S46M: NO), control returns to S45. When the busy command is received (S46M: YES), control proceeds to S47M, where the status is notified as shown in FIG. 9, and control proceeds to S56. Thus, according to the modification shown in FIG. 12, if the outside line connection request is urgent, the CPU 30 transmits the interruption request command to the main phone 1 without waiting for receipt of the busy signal.

This control is advantageous since even through the main phone is occupied, it is interrupted immediately and automatically, and the urgent outside line request command is accepted by the main phone 1 immediately. Although not shown for the brevity, the operation of the main phone 1 should also be modified so as to meet the control illustrated in FIG. 12. Such a modification of the control of the main phone 1 can easily be done by a person skilled in the art in accordance with the procedure shown in FIG. 12.

Alternatively, the procedure of FIG. 10 may also be modified such that step S47 is executed before S56 is executed, that is, after it is determined that the outside line connection request is not urgent (S48: NO). With this modification, when the busy signal is transmitted from the main phone 1, and it is determined the outside line connection request is urgent, the interruption request command is transmitted to the main phone immediately, without notifying the user of the busy condition of the main phone 1.

It should be noted that the present invention need not be limited to the configurations of the above-described exemplary embodiment, and various modifications thereof may also be considered within the scope of the invention.

The messages displayed on the LCD panels of the cordless handset and the main phone need not be limited to the above-described ones, and can be modified in various ways.

Further, in the above-described embodiment, the telephone system uses the public telephone line network. However, the invention can also be applied to a communication system using an IP (Internet Protocol) telephone system using the Internet.

It should be noted that, as the subsidiary device, another mobile device such as a PDA (Personal Digital Assistant) may be optionally or alternatively used.

The present disclosure relates to the subject matter contained in Japanese Patent Application No. 2002-255440, filed on Aug. 30, 2002, which is expressly incorporated herein by reference in its entirety.

What is claimed is:

1. A communication system comprising:
   a main device capable of communicating with a destination station through a line; and
   at least one subsidiary device connectable to said main device,
   said subsidiary device including a connection request signal transmitting system that transmits a connection requesting signal requesting to perform a communication through the line to said main device, said main device including a status signal transmitting system that transmits a status signal indicative of an operational status of said main device to said subsidiary device in response to the connection requesting signal transmitted from said subsidiary device, wherein said subsidiary device performs different operations in accordance with the status signal transmitted from said main device, said subsidiary device transmits a line release requesting signal requesting the main device to automatically release the line, when a communication to be performed by said subsidiary device satisfies a predetermined condition and said subsidiary device receives the status signal indicating that the main device is using the line.

2. The communication system according to claim 1, wherein said predetermined condition includes urgency of the communication.

3. The communication system according to claim 1, wherein said predetermined condition includes at least one predetermined number.

4. The communication system according to claim 1, wherein if the predetermined condition is not satisfied, the connection between said main device and said subsidiary device is cut.

5. The communication system according to claim 1, wherein said main device includes a notification system that notifies that the line is to be released when said main device receives the line release requesting signal from said subsidiary device.

6. The communication system according to claim 1, wherein the at least one subsidiary device is wirelessly connectable to said main device.

* * * * *